(12) United States Patent
Weill et al.

(10) Patent No.: US 9,734,579 B1
(45) Date of Patent: Aug. 15, 2017

(54) THREE-DIMENSIONAL MODELS VISUAL DIFFERENTIAL

(71) Applicant: Google Inc., Mountain View, CA (US)

(72) Inventors: Jonathan Weill, Mountain View, CA (US); Dror Aiger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 14/612,406

(22) Filed: Feb. 3, 2015

(51) Int. Cl.
G06T 19/00 (2011.01)
G06T 7/00 (2017.01)
G06T 15/10 (2011.01)
G06T 17/00 (2006.01)
G06T 17/20 (2006.01)

(52) U.S. Cl.
CPC .............. *G06T 7/003* (2013.01); *G06T 15/10* (2013.01); *G06T 17/00* (2013.01); *G06T 17/20* (2013.01); *G06T 19/00* (2013.01)

(58) Field of Classification Search
CPC ......... G06T 19/00; G06T 17/20; G06T 17/00; G06T 7/003; G06T 15/10
See application file for complete search history.

(56) References Cited

U.S. PATENT DOCUMENTS

| 8,451,323 | B1* | 5/2013 | Poursohi | G01B 11/00 348/43 |
| 2009/0297044 | A1* | 12/2009 | Kokumai | G06K 9/40 382/219 |
| 2011/0310246 | A1* | 12/2011 | Hornabrook | G01N 21/87 348/142 |
| 2013/0151315 | A1* | 6/2013 | Akinola | G06Q 10/06 705/7.36 |
| 2014/0292753 | A1* | 10/2014 | Bi | G06T 15/00 345/420 |

* cited by examiner

*Primary Examiner* — Tapas Mazumder
(74) *Attorney, Agent, or Firm* — McDonnell Boehnen Hulbert & Berghoff LLP

(57) ABSTRACT

Methods and systems for rendering a three-dimensional (3D) data model of an object are provided. An example method may include receiving information associated with a first 3D data model and a second 3D data model of an object. The method may also include rendering a first set of images of the first 3D data model, and rendering a second set of images of the second 3D data model. The method may also include comparing respective images of the first set of images to images of the second set of images to determine a plurality of image difference scores between the respective images of the first set of images and the images of the second set of images. The method may also include determining an object difference score based on the determined plurality of image difference scores.

17 Claims, 6 Drawing Sheets

| OBJECT | OBJECT DIFFERENCE SCORE | DISPLAY RENDERINGS |
|---|---|---|
| Object 4 | 0.54 | |
| Object 7 | 0.51 | |
| Object 1 | 0.46 | |
| Object 15 | 0.42 | |
| Object 11 | 0.3 | |
| Object 2 | 0.25 | |
| Object 3 | 0.21 | |
| Object 8 | 0.19 | |
| Object 13 | 0.17 | |
| Object 11 | 0.15 | |
| Object 12 | 0.09 | |
| Object 6 | 0.5 | |
| Object 10 | 0.4 | |
| Object 5 | 0.0 | |
| Object 9 | 0.0 | |

FIG. 4

THREE-DIMENSIONAL MODELS VISUAL DIFFERENTIAL

BACKGROUND

In computer graphics, three-dimensional (3D) modeling involves generation of a representation of a 3D surface of an object. The representation may be referred to as a 3D object data model and can be rendered or displayed as a two-dimensional image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one aspect, the present disclosure provides a method operable by a computing device. The method may include receiving information associated with a first 3D data model of an object. The method may also include receiving information associated with a second 3D data model of the object. The method may also include rendering a first set of images of the first 3D data model, where images of the first set of images are rendered from respective angles with respect to the object. The method may also include rendering a second set of images of the second 3D data model, where images of the second set of images are rendered from the respective angles with respect to the object. The method may also include indexing images of the second set of images to correspond to respective images of the first set of images. The method may also include comparing respective images of the first set of images to images of the second set of images to determine a plurality of image difference scores between the respective images of the first set of images and the images of the second set of images. The method may also include determining an object difference score based on the determined plurality of image difference scores.

In another aspect, the present disclosure provides a non-transitory computer readable memory having stored thereon that, in response to execution by a computing device, cause the computing device to perform functions. The functions may include receiving information associated with a first 3D data model of an object. The functions may also include receiving information associated with a second 3D data model of the object. The functions may also include rendering a first set of images of the first 3D data model, where images of the first set of images are rendered from respective angles with respect to the object. The functions may also include rendering a second set of images of the second 3D data model, where images of the second set of images are rendered from the respective angles with respect to the object. The functions may also include indexing images of the second set of images to correspond to respective images of the first set of images. The functions may also include comparing respective images of the first set of images to images of the second set of images to determine a plurality of image difference scores between the respective images of the first set of images and the images of the second set of images. The functions may also include determining an object difference score based on the determined plurality of image difference scores.

In yet another aspect, the present disclosure provides a system. The system may include at least one processor and data storage including program instructions executable by the at least one processor to cause the system to perform functions. The functions may include receiving information associated with a first 3D data model of an object. The functions may also include receiving information associated with a second 3D data model of the object. The functions may also include rendering a first set of images of the first 3D data model, where images of the first set of images are rendered from respective angles with respect to the object. The functions may also include rendering a second set of images of the second 3D data model, where images of the second set of images are rendered from the respective angles with respect to the object. The functions may also include indexing images of the second set of images to correspond to respective images of the first set of images. The functions may also include comparing respective images of the first set of images to images of the second set of images to determine a plurality of image difference scores between the respective images of the first set of images and the images of the second set of images. The functions may also include determining an object difference score based on the determined plurality of image difference scores.

In another aspect, the present disclosure provides another method for a processor to render a 3D data model of an object. The method may include receiving information associated with a first 3D data model of the object. The method may also include receiving information associated with a second 3D data model of the object. The method may also include rendering a first set of images of the first 3D data model, where images of the first set of images are rendered from respective angles with respect to the object. The method may also include rendering a second set of images of the second 3D data model, where images of the second set of images are rendered from the respective angles with respect to the object. The method may also include indexing images of the second set of images to correspond to respective images of the first set of images. The method may also include comparing respective images of the first set of images to images of the second set of images to determine a plurality of image difference scores between the respective images of the first set of images and the images of the second set of images. The method may also include determining an object difference score based on the determined plurality of image difference scores. The method may also include rendering the second 3D data model of the object for display if the determined object difference score is below a threshold. If the determined object difference score is above the threshold, the method may include rendering the first 3D data model of the object for display, rendering the second 3D data model of the object for display adjacent the first 3D data model, and providing for display a bounding box around an area on the second 3D data model of the object having the highest image difference score of the plurality of image difference scores.

In yet another aspect, a system may include a means for receiving information associated with a first 3D data model of an object. The system may also include a means for receiving information associated with a second 3D data model of the object. The system may also include a means for rendering a first set of images of the first 3D data model, where images of the first set of images are rendered from respective angles with respect to the object. The system may also include a means for rendering a second set of images of the second 3D data model, where images of the second set of images are rendered from the respective angles with respect to the object. The system may also include a means for indexing images of the second set of images to correspond to respective images of the first set of images. The system may also include a means for comparing respective images of the first set of images to images of the second set of images to determine a plurality of image difference scores between the respective images of the first set of images and the images of the second set of images. The system may also include a means for determining an object difference score based on the determined plurality of image difference scores.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 4 illustrates an example output for comparing 3D data models of a group of objects.

DETAILED DESCRIPTION

Figure 1:
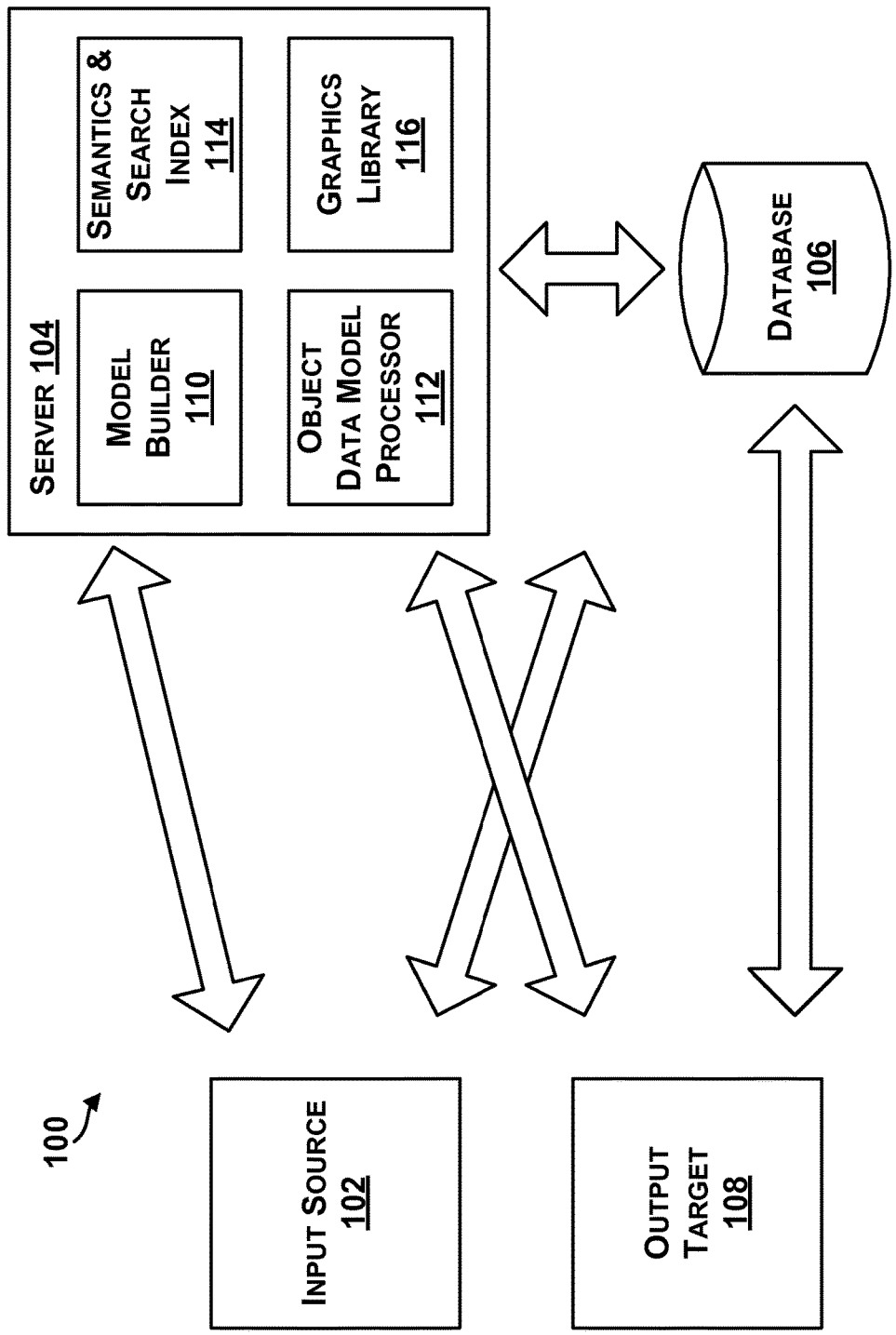
FIG. 1 illustrates an example system for object data modeling.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for determining a perceived difference between two 3D data models of an object. As described above, various techniques exist for generating 3D object data models. For example, a 3D data model of an object may be created by scanning the object from a number of different angles, and the scanned images can be algorithmically combined using a computing device to generate the 3D data model of the object. As another example, an image of an object may be used to generate a point cloud that can be algorithmically processed by a computing device to generate the 3D data model. Other systems and methods for generating 3D data models are possible as well.

Such systems and methods used to generate 3D data models may be frequently adjusted in an attempt to improve the reconstruction quality of 3D objects. The adjustments may include changes to source code, or changes to other configurable parameters of the system. Both types of these adjustments will be referred to as configuration changes. Configuration changes may occur frequently, both in a deployed 3D reconstruction pipeline and as part of experimental work done by engineers and researchers. However, evaluating whether configuration changes have an overall positive effect on a 3D data model may be a tedious and time-consuming task. Typically, this is done by manually observing the results of a 3D reconstruction system before and after the configuration changes. However, many changes only affect a small part of the 3D data model, which may make it difficult to spot the differences in the two 3D data models. Therefore, it may be advantageous to provide an object difference score for textured 3D models.

Such an object difference score may reduce testing time for a 3D data model of a single 3D object by guiding a user to areas with significant changes, for example. The object difference score may further reduce the manual testing time for a group of objects. For example, the object difference score may enable a computing device to sort the objects in a test set by how much they were affected by a configuration change, so that a user may inspect the most affected objects first. In another example, the object difference score may be used to confirm that refactoring of source code results in no change to the rendered objects.

In one example, the object difference score may be computed by a computing device. The computing device may determine a first set of images of a first 3D data model. The first 3D data model may be computed prior to any configuration changes to the 3D reconstruction system. The computing device may then determine a second set of images of a second 3D data model. The second 3D data model may be computed after one or more configuration changes were applied to the 3D reconstruction system. The first and second sets of images are rendered from respective angles with respect to the object. The computing device may then compare respective images of the first set of images to images of the second set of images to determine a plurality of image difference scores in the range [0, 1] between the respective images of the first set of images and the images of the second set of images. Finally, the computing device may determine an object difference score in the range [0, 1] based on the determined plurality of image difference scores.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

As discussed above, a 3D object may be modeled using a wireframe built of triangles or other polygons to approximate the geometric surface of the object, and the triangles may be textured using multiple camera images. Therefore, each triangle of the wireframe model can be assigned to one camera image. In some cases, two triangles that share a boundary may be textured from different images, which may lead to texture distortion seams between those triangles. Therefore, an approach that minimizes texture distortion associated with the boundaries between triangles mapped from different images may be desirable.

Figure 2:
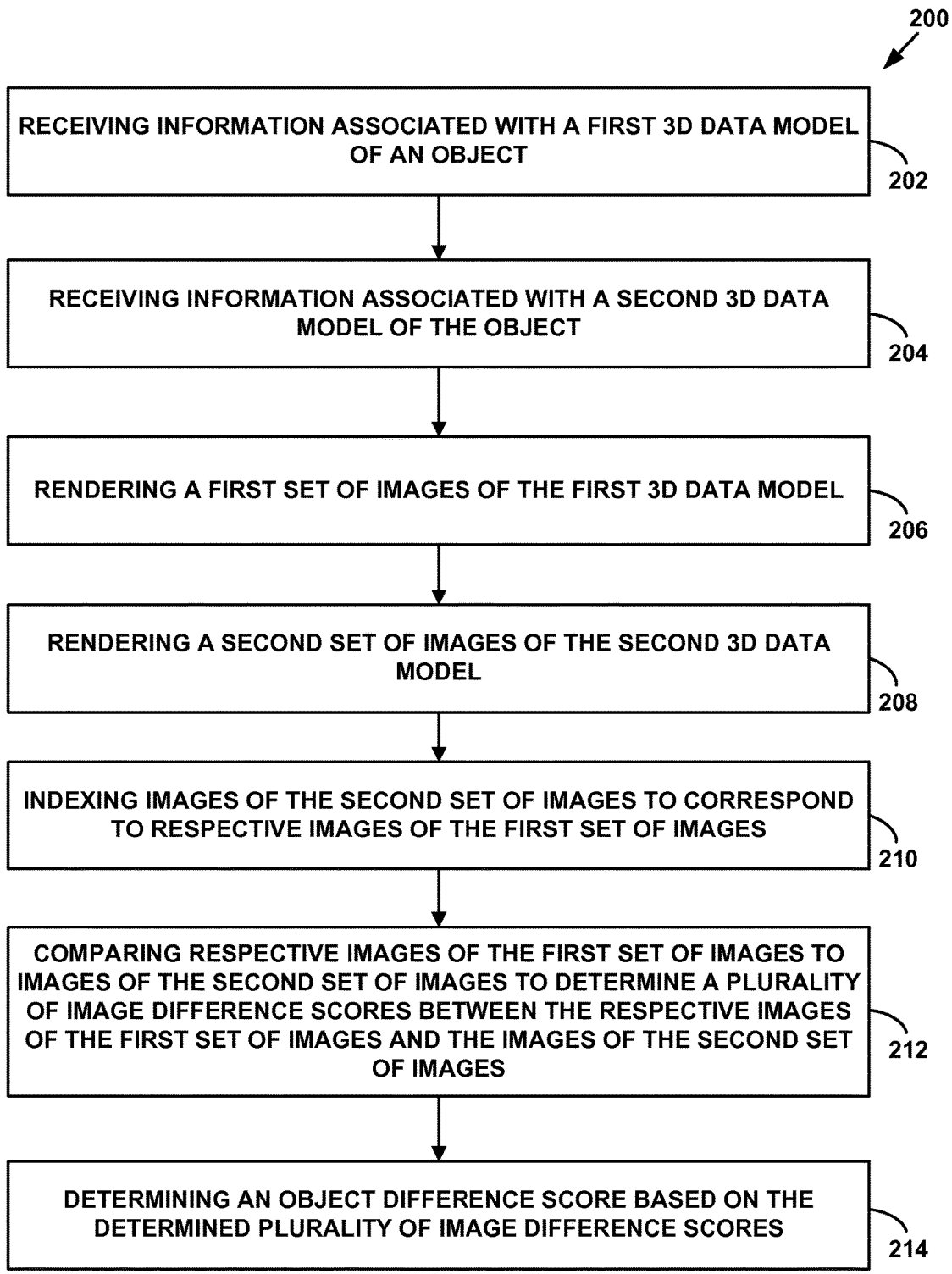
FIG. 2 is a block diagram of an example method for determining a perceived difference between two 3D data models of an object.

FIG. 2 is a block diagram of an example method for determining a perceived difference between two 3D data models of an object. Method 200 shown in FIG. 2 presents an embodiment of a method that could be used by the system 100 of FIG. 1, for example. Method 200 may include one or more operations, functions, or actions as illustrated by one or more of blocks 202-214. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes receiving information associated with a first 3D data model of an object. The object can be any 3D object (e.g., a bag, a shoe, a phone, a statue, etc.). As described above, various techniques exist for generating 3D object data models. For example, a 3D data model of an object may be created by scanning the object from a number of different angles, and the scanned images can be algorithmically combined by a computing device to generate the 3D data model of the object. As another example, an image of an object may be used to generate a point cloud that can be algorithmically processed by a computing device to generate the 3D data model. Other examples are possible as well. As such, the first 3D data model of the object may be computed using a system including source code and configurable parameters. In some examples, the first 3D data model of the object may be provided by a server in a format suitable for display in a web browser or other application. 3D object data models may be of any size and include and represent any number of objects.

At block 204, the method 200 includes receiving information associated with a second 3D data model of the object. The second 3D data model of the object may be computed using a different system than the system used to compute the first 3D data model of the object. For example, the source code and/or one or more of the configurable parameters of the system used to compute the first 3D data model of the object may be adjusted to compute the second 3D data model of the object. In other words, the first and second 3D data models represent two 3D models of the same object computed using different methods and/or systems.

At block 206, the method 200 includes rendering a first set of images of the first 3D data model. Images of the first set of images may be rendered from respective angles with respect to the object by a computing device, such as a server for example. The first set of images is a 2D representation of the first 3D data model from the respective angles. As such, the first set of images represent 2D images of an exterior surface of the first 3D data model of the object. As a specific example, the computing device may be configured to render 100 images from 100 different angles around the first object. Other examples are possible as well.

At block 208, the method 200 includes rendering a second set of images of the second 3D data model. Images of the second set of images may be rendered from the same respective angles with respect to the object as the images of the first set of images. As discussed above, the second set of images is a 2D representation of the second object, such that the second set of images represents 2D images of an exterior surface of the second 3D data model of the object. Using the example described above, the computing device may be configured to render 100 images from the 100 different angles around the second object. The 100 angles around the first object are the same 100 angles as those around the second object. Other examples are possible as well.

In some examples, the first object and the second object may be aligned to a common reference frame before the computing device renders the first and second sets of images. The first object and the second object may be processed and aligned using any number of processes, such as an iterative closest point (ICP) algorithm as an example. In embodiments, the geometry from the different renderings may be brought into close agreement by initializing the views based translating the center of mass of each rendering to (0, 0, 0). In some examples, the first and second renderings may be aligned by an alignment server and received at another server for further processing. Other example alignment mechanisms are possible as well.

At block 210, the method 200 includes indexing images of the second set of images to correspond to respective images of the first set of images. In an example, each image of the second set of images may correspond to a respective image of the first set of images. For example, if the images of the second set of images are rendered from the same angles as the images of the first set of images, then a given image of the second set of images rendered from a given angle is indexed to correspond to a respective image of the first set of images rendered from the given angle. Other correspondence arrangements are possible.

At block 212, the method 200 includes comparing respective images of the first set of images to images of the second set of images to determine a plurality of image difference scores between the respective images of the first set of images and the images of the second set of images. An image difference score may return a normalized value in the range of [0, 1], where 0 means the two images are identical, and 1 means the images are completely different. A given image difference score may be calculated by comparing a first image of the first object rendered from a given angle to a second image of the second object rendered from the given angle. In one example, the comparison may include a pixel-by-pixel comparison between the first image and the second image. Further, the comparison may include a difference in RGB color between the respective pixels of the first image and the second image. Other examples are possible as well.

As a specific example, the computing device may render 100 images from 100 different angles around the first and second renderings of the object. This results in 100 pairs of images that are then compared. The comparison of each set of images from respective angles results in an image different score in the range of [0, 1]. Therefore, the result of comparing the respective images of the first set of images to images of the second set of images is 100 image different scores in the range of [0, 1].

At block 214, the method 200 includes determining an object difference score based on the determined plurality of image difference scores. The object difference score represents a perceived difference between two rendered 3D data models of an object. The difference is a perceived difference since changes to the interior of the renderings of the object are not accounted for in the determination of the object difference score. This way, the object difference score is derived from models of the human visual system (and specifically of 3D projections to an image plane), which may result in a higher correlation with human perception. The object difference score returns a normalized value in the range of [0, 1], where 0 means the two renderings of the object are identical, and 1 means the two renderings of the object are completely different. Using the example described above, the computing device calculates 100 image different scores in the range of [0, 1] based on the rendered images from respective angles around the rendered object.

In one example, the computing device may determine the object difference score by averaging the 100 image difference scores. In another example, the computing device may determine a maximum image difference score between the respective images of the first set of images and the images of the second set of images, determine a minimum image difference score between the respective images of the first set of images and the images of the second set of images, and then determine an average of the maximum image difference score and the minimum image difference score to determine the object difference score.

In yet another example, the computing device may determine a weighting coefficient for each of the respective angles with respect to the object. The weighting coefficient may account for viewpoints that are used more often by viewers than other viewpoints. For example, the computing system may be configured to show a rendered 3D data model of an object at a given viewpoint in a default setting. In such a case, the respective angle that corresponds to the given viewpoint may be assigned a higher weighting coefficient, so that changes between images of the first rendering of an object and the second rendering of the object are magnified in determining the object difference score. Once the computing device determines the weighting coefficient for each of the respective angles, the computing device may multiply the weighting coefficient by a corresponding image difference score to determine a plurality of weighted image difference scores. The computing device may then determine an average of the weighted image difference scores to determine the object difference score.

In some examples, the method 200 may further include rendering the first 3D data model of the object for display and further rendering the second 3D data model of the object for display. A computing device or image generation module may be configured to generate the 3D models of the object and may be configured to render the 3D data models of the object for display to create a 3D visualization of the object for a user to view fine details of the object from any angle and zoom in and out, for example. The computing device may further provide a user interface comprising displays of the 3D object data models. In one example, WebGL, OpenGl, or other software libraries may be used to generate interactive 3D models from the 3D object data models. In some examples, a 3D object data model viewer may be used to display images of the 3D objects data models within a display of a user interface. The 3D object data model viewer may be implemented using WebGL within a web browser, or OpenGL, for example.

In one instance, displays of the multiple 3D objects may be provided such that individual 3D objects are viewable simultaneously. In another instance, the displays may be provided side-by-side within one window. In one example, the first 3D data model of the object and the second 3D data model of the object are displayed at a given angle of the respective angles, where the given angle represents the angle having the highest image difference score of the plurality of image difference scores. That way, a user is directed to a side-by-side comparison of the area having the greatest difference between two renderings of the same object. In other instances, the displays may be provided in separate windows.

In another example, the computing device may render the second 3D data model of the object if the determined object difference score is below a threshold. For example, if the object difference score is below 0.3, the computing device may simply render the second 3D data model of the object for display, thereby indicating to a user that the difference between the first rendering and the second rendering are insubstantial. If the determined object difference score exceeds the threshold, the computing device may rendering the first data model of the object for display, render the second data model of the object for display adjacent the first 3D data model, and provide a bounding box around an area on the second 3D data model having the highest image difference score. In such a scenario, the bounding box highlights for a user the area where the changes between the first rendering and the second rendering are the greatest, thereby saving the user time in searching for such areas.

Figure 3:
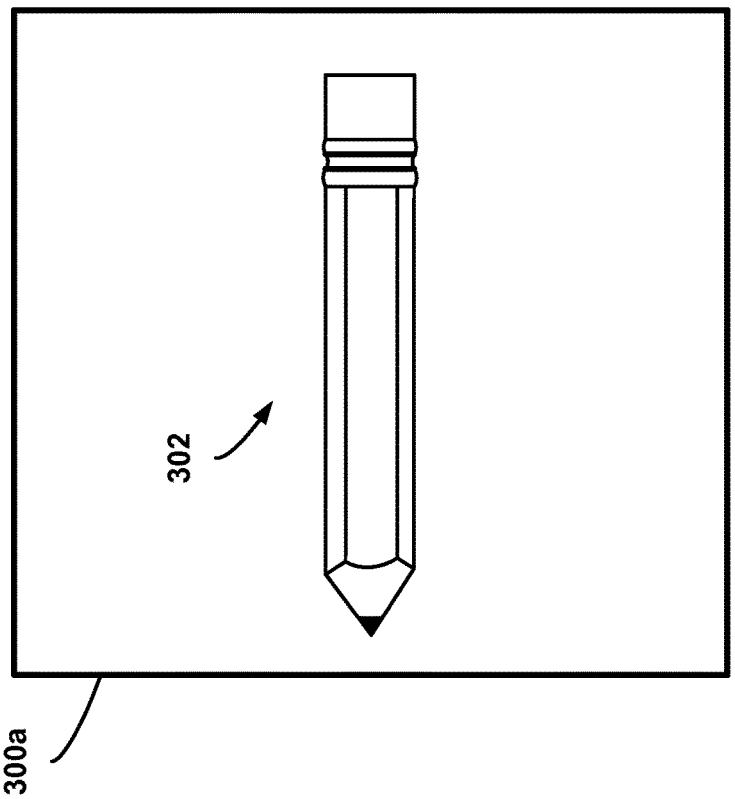
FIG. 3 illustrates example displays of two renderings of 3D data models of an object.
Figure 3:
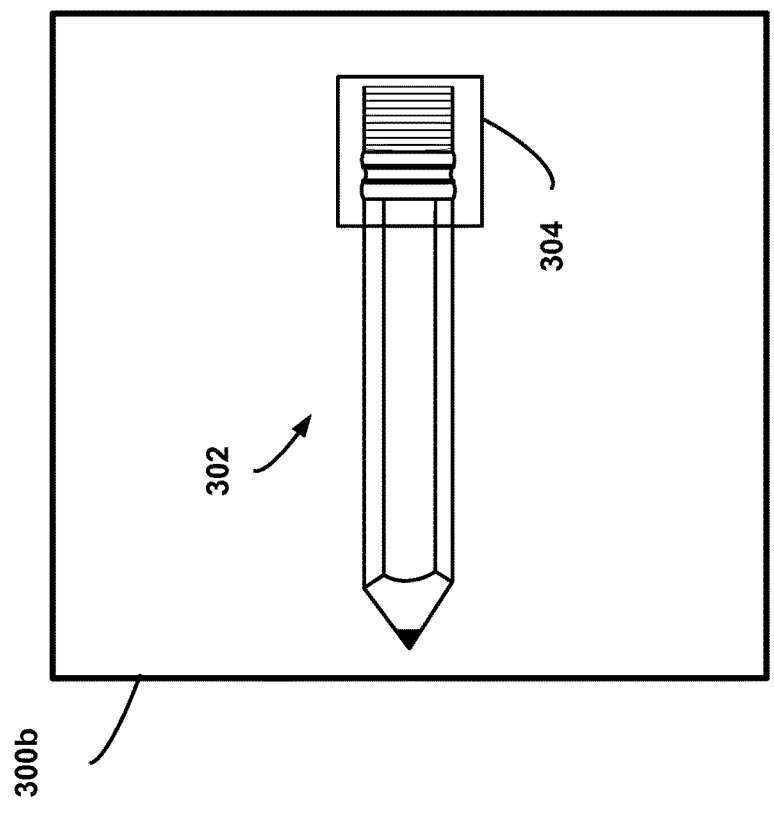

FIG. 3 illustrates example displays of two renderings of 3D data models of an object 302. A user interface may include two separate windows 300a and 300b displaying a first 3D data model of the object 302 and a second 3D data model of the object 302, respectively. Further, the user interface may enable a user to zoom in on a region of a 3D model. For example, a user may click and drag a cursor over a region of a 3D model to select an area to zoom in or out. The second rendering 300b may further include a bounding box 304 around an area on the second 3D data model of the object 302. As discussed above, the bounding box may highlight for a user the area where the changes between the first rendering and the second rendering are the greatest.

As discussed above, methods and systems used to generate 3D data models may be frequently adjusted in an attempt to improve the reconstruction quality of 3D objects. The adjustments may include changes to the source code of such systems, or changes to other configurable parameters. Evaluating whether configuration changes have an overall positive effect on a 3D data model may be a tedious and time-consuming task. Typically, this is done by manually observing the results of a 3D reconstruction system before and after the configuration changes. However, many changes only affect a small part of the 3D data model, which may make it difficult to spot the differences in the two 3D data models. Therefore, it may be advantageous to provide an object difference score for textured 3D models.

Such an object difference score may reduce testing time for a 3D data model of a single 3D object by guiding a user to areas with significant changes, as shown in FIG. 3. The object difference score may further reduce the manual testing time for a group of objects. For example, the object difference score may enable a computing device to sort the objects in a test set by how much they were affected by a configuration change, so that a user may inspect the most affected objects first.

FIG. 4 illustrates an example output for comparing a group of objects based on changes to the methods and systems used to generate 3D data models. For example, a computing device may store a first set of renderings of a group of 3D objects, where the first set of renderings are computed using a first method. The computing device may further store a second set of renderings of the group of 3D objects, where the second set of renderings are computed using a second method. The computing device may then determine an object difference score for each object in the group of objects, as discussed above in relation to FIG. 2.

As shown in FIG. 4, a group of 15 objects were rendered using a first method, and the same 15 objects were rendered using a second method. Using the methods discussed above in relation to FIG. 2, the computing device determined an object difference score for each of the 15 objects in the group of objects. As shown in FIG. 4, the computing device may produce a table 400 to display the determined object difference scores. The table 400 may include a list of objects 402, a determined object difference score 404 for each of the objects 402, and an option to display the first and second renderings 406 of each of the objects 402. The table enables a user to only focus on those objects in the group of objects that had the greatest amount of change between the first rendering using the first method and the second rendering using the second method.

Further, the table 400 may sort the determined object difference scores 404 such that those objects with the greatest object difference score are situated at the top of the table 400. In addition, the table 400 may further include an option to view the renderings 406 of a given object. The option to display the renderings 406 of the given object may include a side-by-side display of the first rendering and the second rendering. In one example, the first 3D data model of the object and the second 3D data model of the object are displayed at a given angle of the respective angles, where the given angle represents the angle having the highest image difference score of the plurality of image difference scores. That way, a user is directed to a side-by-side comparison of the area having the greatest difference between two renderings of the given object. In another example, the displayed second rendering may further include a bounding box around an area on the second 3D data model of the object. As discussed above, the bounding box may highlight for a user the area where the changes between the first rendering and the second rendering are the greatest.

In another example, the object difference score may be used to confirm that refactoring of source code results in no change to the rendered objects. In such a case, a user would predict that the table 400 results in an object difference score of 0.0 for each of the 15 objects in the group of objects. If such a result does not occur, the user would subsequently adjust the refactoring to ensure that the changes to the source code result in no change to the rendered objects.

Figure 5:
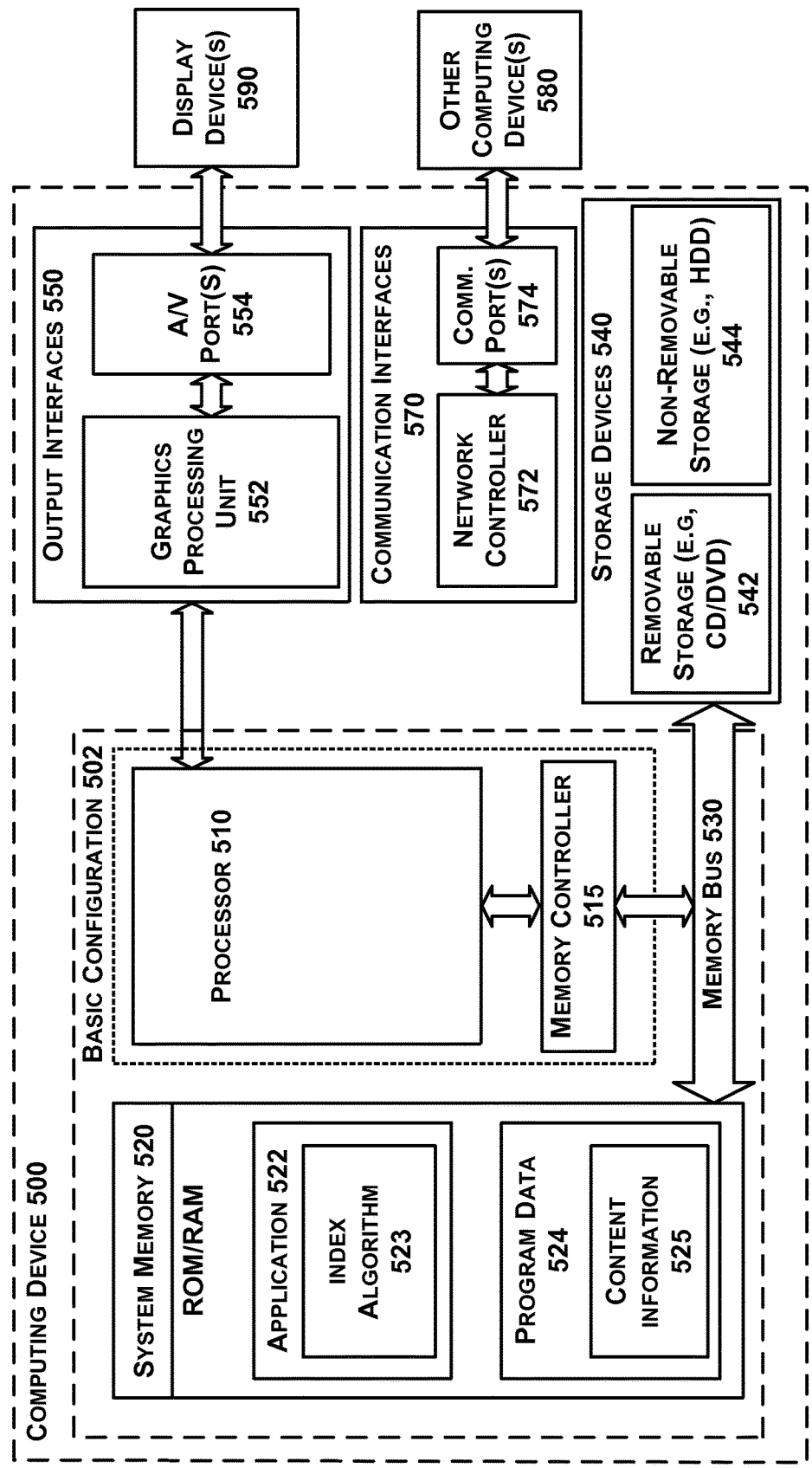
FIG. 5 is a functional block diagram illustrating an example computing device used in a computing system that is arranged in accordance with at least some embodiments described herein.

FIG. 5 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for seamless texturing of 3D meshes from multiple calibrated views as described in FIGS. 1-4B. In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (µP), a microcontroller (µC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include an index algorithm 523 that is arranged to provide inputs to the electronic circuits, in accordance with the present disclosure. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include output interfaces 550 that may include a graphics processing unit 552, which can be configured to communicate to various external devices such as display devices 590 or speakers via one or more A/V ports 554 or a communication interface 570. The communication interface 570 may include a network controller 572, which can be arranged to facilitate communications with one or more other computing devices 580 over a network communication via one or more communication ports 574. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

Figure 6:
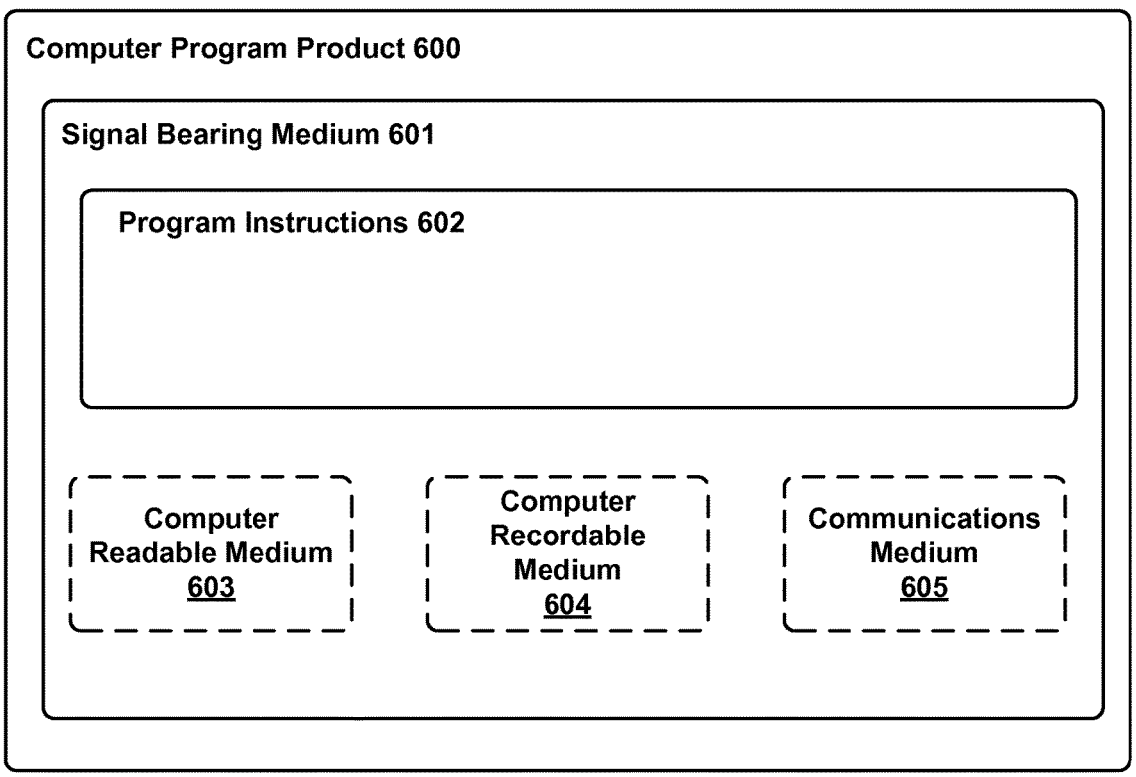
FIG. 6 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-4B. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 600 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

We claim:

1. A method operable by a computing device comprising:
   receiving information associated with a first three-dimensional (3D) data model of an object;
   receiving information associated with a second 3D data model of the object;
   rendering a first set of images of the first 3D data model, wherein images of the first set of images are rendered from respective angles with respect to the object;
   rendering a second set of images of the second 3D data model, wherein images of the second set of images are rendered from the respective angles with respect to the object;
   indexing images of the second set of images to correspond to respective images of the first set of images;
   comparing respective images of the first set of images to images of the second set of images to determine a plurality of image difference scores between the respective images of the first set of images and the images of the second set of images;
   determining an object difference score based on the determined plurality of image difference scores;
   rendering the first 3D data model of the object for display; and
   rendering the second 3D data model of the object for display, wherein the first 3D data model of the object and the second 3D data model of the object are displayed at a given angle of the respective angles, and wherein the given angle represents the angle having the highest image difference score of the plurality of image difference scores.

2. The method of claim 1, further comprising:
   aligning the first 3D data model and the second 3D data model to a common reference frame.

3. The method of claim 1, wherein the first 3D data model of the object and the second 3D data model of the object are displayed side-by-side.

4. The method of claim 1, wherein the object represents one of a plurality of objects, the method further comprising:
   determining the object difference score for each of the plurality of objects; and
   providing a list of the determined object difference scores for the plurality of objects.

5. The method of claim 4, further comprising:
   rendering a given object of the plurality of objects for display if the object difference score for the given object exceeds a threshold.

6. The method of claim 1, wherein determining an object difference score based on the determined plurality of image difference scores comprises determining an average of the plurality of image difference scores.

7. The method of claim 1, wherein determining an object difference score based on the determined plurality of image difference scores comprises:
   determining a maximum image difference score between the respective images of the first set of images and the images of the second set of images;
   determining a minimum image difference score between the respective images of the first set of images and the images of the second set of images; and
   determining an average of the maximum image difference score and the minimum image difference score.

8. The method of claim 1, wherein determining an object difference score based on the determined plurality of image difference scores comprises:

determining a weighting coefficient for each of the respective angles with respect to the object;

multiplying the weighting coefficient for the respective angles by a corresponding image difference score to determine a plurality of weighted image difference scores; and determining an average of the plurality of weighted image difference scores.

9. A non-transitory computer readable medium having stored thereon instructions, that when executed by a computing device, cause the computing device to perform functions comprising:

receiving information associated with a first three-dimensional (3D) data model of an object;

receiving information associated with a second 3D data model of the object;

rendering a first set of images of the first 3D data model, wherein images of the first set of images are rendered from respective angles with respect to the object;

rendering a second set of images of the second 3D data model, wherein images of the second set of images are rendered from the respective angles with respect to the object;

indexing images of the second set of images to correspond to respective images of the first set of images;

comparing respective images of the first set of images to images of the second set of images to determine a plurality of image difference scores between the respective images of the first set of images and the images of the second set of images;

determining an object difference score based on the determined plurality of image difference scores;

rendering the first 3D data model of the object for display; and rendering the second 3D data model of the object for display, wherein the first 3D data model of the object and the second 3D data model of the object are displayed at a given angle of the respective angles, and wherein the given angle represents the angle having the highest image difference score of the plurality of image difference scores.

10. The non-transitory computer readable medium of claim 9, wherein determining an object difference score based on the determined plurality of image difference scores comprises determining an average of the plurality of image difference scores.

11. The non-transitory computer readable medium of claim 9, wherein determining an object difference score based on the determined plurality of image difference scores comprises:

determining a weighting coefficient for each of the respective angles with respect to the object;

multiplying the weighting coefficient for the respective angles by a corresponding image difference score to determine a plurality of weighted image difference scores; and determining an average of the plurality of weighted image difference scores.

12. A system comprising:

at least one processor; and non-transitory data storage including program instructions stored thereon that when executed by the at least one processor, cause the system to:

receive information associated with a first three-dimensional (3D) data model of an object;

receive information associated with a second 3D data model of the object;

determine a first set of images of the first 3D data model, wherein images of the first set of images are rendered from respective angles with respect to the object;

determine a second set of images of the second 3D data model, wherein images of the second set of images are rendered from the respective angles with respect to the object;

index images of the second set of images to correspond to respective images of the first set of images;

compare respective images of the first set of images to images of the second set of images to determine a plurality of image difference scores between the respective images of the first set of images and the images of the second set of images;

determine an object difference score based on the determined plurality of image difference scores;

render the first 3D data model of the object for display; and render the second 3D data model of the object for display, wherein the first 3D data model of the object and the second 3D data model of the object are displayed at a given angle of the respective angles, and wherein the given angle represents the angle having the highest image difference score of the plurality of image difference scores.

13. The system of claim 12, wherein the program instructions are further executable by the at least one processor to cause the system to:

align the first 3D data model and the second 3D data model to a common reference frame.

14. The system of claim 12, wherein the object represents one of a plurality of objects, and wherein the program instructions are further executable by the at least one processor to cause the system to:

determine the object difference score for each of the plurality of objects; and provide a list of the determined object difference scores for the plurality of objects.

15. The system of claim 12, wherein determining an object difference score based on the determined plurality of image difference scores comprises determining an average of the plurality of image difference scores.

16. The system of claim 12, wherein determining an object difference score based on the determined plurality of image difference scores comprises:

determining a weighting coefficient for each of the respective angles with respect to the object;

multiplying the weighting coefficient for the respective angles by a corresponding image difference score to determine a plurality of weighted image difference scores; and determining an average of the plurality of weighted image difference scores.

17. A method for a processor to render a three-dimensional (3D) data model of an object comprising:

receiving information associated with a first 3D data model of the object;

receiving information associated with a second 3D data model of the object;

rendering a first set of images of the first 3D data model, wherein images of the first set of images are rendered from respective angles with respect to the object;

rendering a second set of images of the second 3D data model, wherein images of the second set of images are rendered from the respective angles with respect to the object;

indexing images of the second set of images to correspond to respective images of the first set of images;

comparing respective images of the first set of images to images of the second set of images to determine a plurality of image difference scores between the respective images of the first set of images and the images of the second set of images;

determining an object difference score based on the determined plurality of image difference scores;

if the determined object difference score is below a threshold, rendering the second 3D data model of the object for display; and if the determined object difference score is above the threshold:
  rendering the first 3D data model of the object for display;
  rendering the second 3D data model of the object for display adjacent the first 3D data model; and providing for display a bounding box around an area on the second 3D data model of the object having the highest image difference score of the plurality of image difference scores.

* * * * *